Patented Aug. 30, 1932

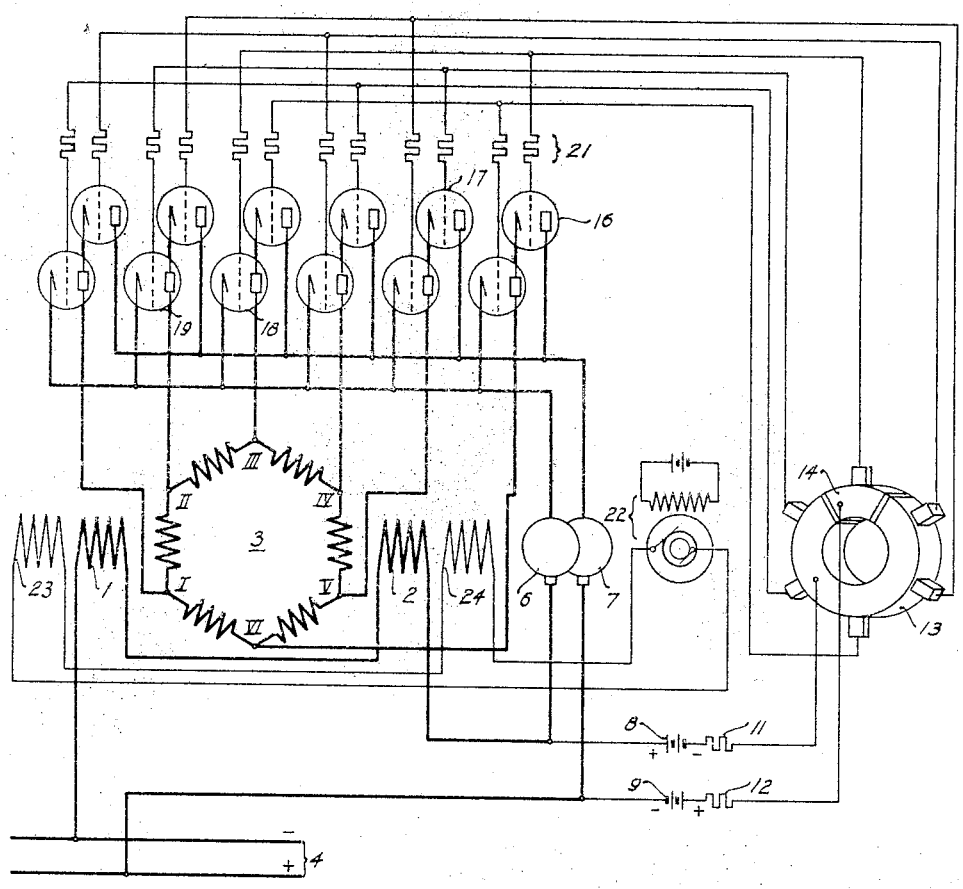

1,873,965

UNITED STATES PATENT OFFICE

ERWIN KERN, OF WETTINGEN, NEAR BADEN, SWITZERLAND, ASSIGNOR TO AKTIEN-GESELLSCHAFT BROWN, BOVERI AND CIE., OF BADEN, SWITZERLAND

APPARATUS FOR COMMUTATING CURRENTS IN POLYPHASE WINDINGS

Application filed August 26, 1929, Serial No. 388,571, and in Germany August 31, 1928.

This invention relates to improvements in devices for commutating direct current in which the operating voltage will not be limited by the voltage of each segment of the usual type of commutator and, therefore, by the number of segments available.

In direct current motors of the usual type, the characteristics of the motors are determined by the proportion of the several portions thereof which cannot usually be modified as desired. To obtain different characteristics, the positions of the brushes on the commutator may be varied either manually or in dependence on electrical or mechanical values occurring in the structure. Such adjustment of the brushes has been found, heretofore, impossible to obtain because of difficulties of commutation which could not be overcome. Another possible means for obtaining the desired result was the shifting of the position of the field relative to the neutral line of the armature, as for example by the variable excitation of a second set of field coils, which means were, however, also unsuccessful because of commutation difficulties.

If, however, commutation is provided for by the use of controlled electric valves, such valves being conductive in only one direction, it is no longer necessary that the portions of the armature windings be commutated when passing through a field of predetermined strength which is proportional to the current as will be seen from the following. Consequently, in a direct current motor having electric valve commutation, the neutral line of the armature may be displaced as desired provided the field strength impressed on the armature is sufficient to produce a reversal of current. The usual controlled electron discharge tube may be used for such purposes without encountering any difficulties in operation, but such tubes are impractical for many reasons inherent in the tube structure itself, chief of which reasons is the limitation of the tubes to small quantities of energy which may pass therethrough.

Controlled electric valves may, however, be used for commutating direct current in a direct current motor armature winding of the conventional construction provided an auxiliary alternating current is superposed on the operating current flowing through the anodes of the valves, the frequency of the auxiliary alternating current being greater than the frequency of the current reversals in the different portions of the armature winding during rotation. Such action periodically causes the current in the valves to pass through a zero value and makes the valves controllable.

It is, therefore, among the objects of the present invention to provide a device for commutating direct current without regard to the number of segments of the usual type of commutator and their voltage as was the case heretofore.

Another object of the present invention is to provide a device for commutating direct current which device will employ controlled electric valves to obtain the desired commutation.

Another object of the invention is to provide a device for commutating direct current in which conductors are connected to the armature windings of a direct current motor and an alternating current is superposed on such conductors to cause the direct current flowing therein to pass, periodically, through zero.

Another object of the invention is to provide a device for commutating direct current in which the alternating current superimposed on the conductors connected with the armature windings of a direct current motor is produced by transformation through a primary winding which is stationary relative to the field system of the motors.

Another object of the invention is to provide an auxiliary alternating current superimposed on an operating current flowing in the conductors connected with the armature windings of a direct current motor by transformation on a primary winding which is co-axial with the commutating portions of the motor windings, the commutating portions of the armature winding forming the secondary winding.

Objects and advantages, other than those above set forth, will be apparent from the following description when read in connection with the accompanying drawing which diagrammatically illustrates one embodiment of the present invention.

Referring more particularly to the drawing by characters of reference, the reference numerals 1 and 2 designate fixed field windings and the reference numeral 3 designates a rotating armature winding of a direct current motor which is supplied with current from a source of supply 4. The armature winding 3 is shown as being divided into only six sections, although it will be evident that the armature may be divided into any number of sections. The connecting points of the several sections are designated by the Roman numerals I to VI inclusive. It is also evident that the motor may be constructed with a fixed armature and a rotating field, the portions of the structures to be described hereinafter being then correspondingly movable or stationary so as to maintain the mechanical relations thereof. The field windings 1 and 2 are connected through sources of direct current 8 and 9, and current limiting resistances 11 and 12 with a commutator having only two segments 13 and 14. A plurality of sliprings 6 and 7 are connected with the field windings 1 and 2 by means of brushes and are connected with the cathodes and anodes respectively of a plurality of electric valves 16, 17, 18 and 19. The grids of the valves are connected through current limiting resistances 21 with a plurality of brushes in contact with the commutator structure 13 and 14. An alternator 22 supplies alternating current of a suitable frequency to an extra pair of field coils 23 and 24 of the direct current motor. It will be seen that each of the armature winding connection points designated by the Roman numerals is connected with one pair of valves which are so connected that one valve of the pair functions to allow current to flow only into the armature and the other valve of the pair functions to allow current to flow only out of the armature winding.

In operation, the structure shown passes through a constantly recurring cycle of operations occurring during the rotation of each connection point of the component windings of the armature from one point in space as shown to another point previously occupied by another connection point. Assuming that the direct current source 4 is connected to the field windings 1 and 2, and that the armature 3 is in the position shown, a circuit is completed from the positive side of the direct current source 4 over slipring 7 to the anode of valve 16, to winding connection point VI, then in both directions through armature winding 3 to the point III and through valve 18, over slipring 6 through field windings 2 and 1, back to the negative side of the direct current source 4. The grids of the valves 16 and 18 have a positive potential impressed thereon from the direct current source 9 through the resistance 12 over segment 14 of the commutator and through the brush in contact therewith and the resistances 21. All of the other valves are kept at a negative potential from the current source 8 through the resistance 11, the segment 13 of the commutator, and the brushes in contact therewith through the resistances 21. During the next instant current also flows from the positive side of current source 4 through the slipring 7 and through valve 17 to point V of the armature winding from which it flows in both directions to point II of the armature winding, and through valve 19 and slipring 6, through the field windings 2 and 1, and back to the negative side of the source 4. The grids of both pairs of valves 16, 18 and 17, 19 then have a positive potential impressed thereon through the battery 9 to the resistance 12, over commutator segment 14 and resistances 21. The grids of all the other valves are kept negative from the battery 8 through the resistances 11, and commutator segment 13 and through resistances 21. During the next moment, the current flows only from the positive side of current source 4 over slipring 7 through valve 17, to point V of the armature windings and from thence in both directions to the point II and out through the valve 19, over slipring 6 and through field windings 2 and 1 back to the negative side of the source 4. The grids of the valves 17 and 19 then have a positive potential impressed thereon from the battery 9 through the resistance 12 and segment 14 of the commutator and through the resistances 21. The grids of all of the other valves have a negative potential impressed thereon from the battery 8 through the resistance 11 and over the segment 13 of the commutator and through the resistances 21. The current flowing through the valves 16 and 18 passes through zero due to the action of the field coils 23, 24 upon the armature winding 3, and the current cannot re-establish itself until the above conditions have again been provided upon the next revolution of the armature 3 due to the action of the grids. It will be understood that the above cycle of operations is completed during the time required for point VI to move from the position shown to that shown for point V and that a similar cycle of circuits is established for each point in the armature winding during each rotation of the armature.

It will be seen that when point VI is, for instance, in the position shown for which the above cycle of circuits were considered in the first series of circuits, the grids of the valves 16 and 18 have a positive potential impressed thereon and the grids of all of the other valves are negative; while in the second series of circuits considered the grids of the valves 16, 17, 18 and 19 are positive and all of the other valves are negative. During the last position of point VI, i. e. before the point reaches the location in space of point I as shown in the drawing, only the grids of the valves 17 and 18 are positive while the grids of all the remaining valves are negative. The current thus has continued to flow through the valves 16 and 18 even though the grids of the valves 17 and 19 were negative until the voltages induced by the auxiliary field windings 23 and 24 balance the difference of the counter electromotive forces produced in the circuits of the armature. As soon as the current has been interrupted in the first circuit, it cannot be re-established until the grids of the valves 16 and 18 again have a positive potential impressed thereon.

Although but one embodiment of the present invention has been illustrated and described, it will be apparent to those skilled in the art that various changes and modifications may be made therein without departing from the spirit of the invention or from the scope of the appended claims.

The invention claimed is:

1. In a motor structure for commutating direct-current, an armature winding divided into a plurality of connected sections, field windings arranged adjacent said armature winding, a source of direct current connected directly with one of said field windings, electric valves connected between the sections of said armature windings, a plurality of sliprings connected with said source of direct current and with said valves, a commutator structure connected with said valves, means for impressing different potentials on different sections of said commutator to control said valves, a source of alternating current, and means coupled with said armature and said field windings for impressing a current thereon from said alternating current source.

2. In a motor structure for commutating direct-current, an armature winding divided into a plurality of connected sections, field windings arranged adjacent said armature winding, a source of direct current connected directly with one of said field windings, electric valves connected between the sections of said armature windings, a plurality of sliprings connected with said source of direct current and with said valves, a commutator structure connected with said valves, means for impressing different potentials on different sections of said commutator to control said valves, a source of alternating current, auxiliary windings arranged adjacent said field windings and connected with said source of alternating current, said auxiliary windings impressing an alternating current on said armature winding.

3. In a motor structure for commutating direct-current, an armature winding divided into a plurality of connected sections, field windings arranged adjacent said armature winding, a source of direct current connected directly with one of said field windings, electric valves connected between the sections of said armature winding and controlling the flow of direct current therethrough, a plurality of sliprings connected with said source of direct current and with said valves, a commutator structure connected with said valves, means for impressing different potentials on different segments of said commutator for controlling said valves, a source of alternating current, the frequency of the alternating current being greater than the frequency of the current reversals in the different section of said armature winding, and auxiliary windings arranged adjacent said field winding and connected with said source of alternating current, said auxiliary windings impressing an alternating current on said armature winding.

4. In a motor structure for commutating direct-current, an armature winding divided into a plurality of connected sections, field windings arranged adjacent said armature winding, a source of direct current connected directly with one of said field windings, electric valves connected between the sections of said armature winding and controlling the flow of direct current through said armature winding, a plurality of sliprings connected with said source of direct current and with said valves, a commutator structure connected with said valves, means for impressing different direct current potentials on different segments of said commutator for controlling said valves, a source of alternating current, the frequency of the alternating current being greater than the frequency of the current reversals in the different sections of said armature winding, and auxiliary windings arranged adjacent said field winding and connected with said source of alternating current, said auxiliary windings being co-axial with said field winding to impress an alternating current on said armature winding.

In testimony whereof I have signed my name to this specification.

ERWIN KERN.